United States Patent
Burch et al.

(10) Patent No.: US 6,878,471 B1
(45) Date of Patent: Apr. 12, 2005

(54) PROCESS FOR THE REGENERATION OF REFORMING CATALYSTS

(75) Inventors: Robert Burch, Antrim (GB); Stanislaw Edmund Golunski, Reading (GB); Barry William Luke Southward, Cheshire (GB); David Wails, Derbyshire (GB)

(73) Assignee: Johnson Matthey Public Limited Company, London (GB)

( * ) Notice: Subject to any disclaimer, the term of this patent is extended or adjusted under 35 U.S.C. 154(b) by 80 days.

(21) Appl. No.: 10/019,903
(22) PCT Filed: Jun. 20, 2000
(86) PCT No.: PCT/GB00/02387
§ 371 (c)(1), (2), (4) Date: May 13, 2002
(87) PCT Pub. No.: WO01/00524
PCT Pub. Date: Jan. 4, 2001

(30) Foreign Application Priority Data

Jun. 24, 1999 (GB) .............................. 9914662

(51) Int. Cl.⁷ ......................... H01M 8/00; B01J 20/34; C01B 3/26
(52) U.S. Cl. ........................... 429/13; 429/17; 429/19; 502/31; 502/33; 502/56; 423/651
(58) Field of Search ............................. 429/17, 13, 12, 429/19; 422/223, 187, 139; 48/127.9; 423/651; 518/704, 703, 709; 502/20, 30, 31, 33, 53, 56

(56) References Cited

U.S. PATENT DOCUMENTS

| 4,083,799 | A |   | 4/1978  | Estes et al. |
| 4,089,941 | A |   | 5/1978  | Villemin |
| 5,043,518 | A |   | 8/1991  | Michaelson et al. |
| 5,075,268 | A |   | 12/1991 | Kurashige et al. |
| 5,310,506 | A | * | 5/1994  | Supp et al. ................. 252/373 |
| 5,624,964 | A | * | 4/1997  | Cimini et al. ............... 518/704 |
| 6,432,378 | B1 | * | 8/2002 | Autenrieth et al. ...... 423/648.1 |

FOREIGN PATENT DOCUMENTS

| DE | 24 03 701    | 8/1975  |
| EP | 0 884 271    | 12/1998 |
| EP | 1 059 262    | 12/2000 |
| JP | 11-79702     | 3/1999  |
| WO | WO 91/19888  | 12/1991 |
| WO | WO 95/01947  | 1/1995  |

OTHER PUBLICATIONS

Rostrup–Nielsen, Jens R., "Industrial relevance of coking," *Catalysis Today*, vol. 37, 1997, pp. 225–232, no month available.

International Search Report dated Oct. 2, 2000.

British Search Report dated Nov. 1, 1999.

* cited by examiner

*Primary Examiner*—Raymond Alejandro
(74) *Attorney, Agent, or Firm*—RatnerPrestia

(57) ABSTRACT

The present invention relates to methods for the regeneration of catalytic reactors. In particular it relates to methods for regenerating a fuel-processing catalyst while it is still being used to supply hydrogen to a fuel cell. The temperature of the catalyst may be adjusted, the air, steam or fuel feed rate may be adjusted. Alternatively, additives may be added to the feed.

8 Claims, 2 Drawing Sheets

PROCESS FOR THE REGENERATION OF REFORMING CATALYSTS

The present invention relates to methods for the regeneration of catalytic reactors.

Catalytic converters are frequently used in internal combustion engines in order to meet the various regulations concerning the levels of pollutants in exhaust gases. A three-way catalyst is a common form of converter used. This has three main duties, namely, the oxidation of CO, the oxidation of unburnt hydrocarbons (HC's) and the reduction of NOx to N2. Such catalysts require careful engine management to ensure that the engine operates at or close to stoichiometric conditions, that is fuel/air lambda=1. Growing awareness of the need to conserve the earth's resources and increasingly stringent legislation have recently prompted a search for cleaner and more efficient alternatives to the internal combustion engine. One of the most promising of these is the combination of an electric motor and a fuel cell. However, the latter requires a source of hydrogen, for which there is no supply and distribution infrastructure comparable to that for liquid fuels.

The use of fuel cells is not just limited to vehicle applications. Emergent markets include domestic co-generation of heat and power, and power generation in remote locations. Again, the availability of hydrogen is a key issue, with natural gas often being the preferred fuel for domestic systems, and liquid hydrocarbons being more transportable to remote locations.

The problems of hydrogen supply and distribution can be overcome by generating it within the fuel-cell system. A hydrogen-rich gas stream, commonly known as 'reformate', can be produced by catalytically converting organic fuels (such as gasoline, natural gas or alcohol). The process, which is referred to as 'reforming' or 'fuel-processing', can occur by a number of different reaction mechanisms:

- dissociation (splitting of the fuel molecules),
- steam reforming (reaction of the fuel with $H_2O$),
- partial oxidation (reaction of the fuel with $O_2$, usually supplied as air)
- combinations of the above reactions.

Because the performance of the reformer has a direct effect on the power output from the fuel cell, deactivation of the catalyst cannot be allowed to proceed unchecked. However the process of power generation cannot be stopped to allow regeneration of the reformer, when its performance falls below an acceptable level. The regeneration of such catalytic reactors whilst they are in use is the problem this invention sets out to solve.

In many instances, the performance of the catalyst declines while it is being used. Although the rate of decline can usually be reduced by changing the operating condition, it is often accompanied by a drop in hydrogen and power output. One frequently practised method for restoring the performance of a fuel processor is to replace the catalyst periodically. Another method involves regenerating the catalyst while it remains in the processor, using a prescribed regeneration procedure (eg see JR Rostrup-Nielsen in Catalysis Today, Vol 37, 1997, p 225–232). However, both these require that the process of hydrogen-generation is interrupted in order to restore performance.

Thus in a first aspect, the present invention provides a method for regenerating a catalytic fuel processor, while it is being used to supply hydrogen to a fuel cell, comprising any one or more of the steps of:

- continuing to pass fuel, air and steam through a reforming catalyst whilst the catalyst is heated by an external heat source such that the temperature of the catalyst may be adjusted,
- continuing to pass fuel, air and steam through a reforming catalyst and modulating the air and/or steam feed rate,
- continuing to pass, air, fuel and steam through a reforming catalyst and modulating the feed-rate of the fuel.
- continuing to pass fuel, air and steam through a reforming catalyst wherein an oxygenate additive is added to the feed.

and maintaining the hydrogen concentration in dry reformate above 25% throughout the operation of the processor.

The reforming catalyst may be one component of the catalytic fuel processor, or it may be the only component. Where loss of performance is being caused by a particular component in a complex fuel mixture, the regeneration method can be targeted at the specific deactivating effect.

Thus in a second aspect, the present invention provides a method for preventing or retarding the de-activation of a catalytic fuel processor while it is being used to supply hydrogen to a fuel cell comprising any one or more of the steps of:

- continuing to pass fuel, air and steam through a reforming catalyst whilst the catalyst is heated by an external heat source such that the temperature of the catalyst may be adjusted,
- continuing to pass fuel, air and steam through a reforming catalyst and modulating the air and/or steam feed rate,
- continuing to pass, air, fuel and steam through a reforming catalyst and modulating the feed-rate of the fuel,
- continuing to pass fuel, air and steam through a reforming catalyst wherein an oxygenate is added to the feed.

and maintaining the hydrogen concentration in dry reformate above 25% throughout the operation of the processor.

Again, the reforming catalyst may be one component or the only component of the catalytic fuel processor. In a preferred embodiment of the invention water is temporarily added to the feed. ('Feed' is a term used to describe the reactant mixture supplied to the fuel processor.) The water will be rapidly converted into steam in the catalyst. The water (steam) to carbon ratio in the feed may readily be adjusted in order to permit targeting of the regeneration method to a specific deactivating event. Adjusted for the purposes of this invention means increased or decreased. The oxygen to carbon ratio may also be adjusted for the same purpose, by adding or changing the feed-rate of air, or by changing the feed-rate of the fuel.

The catalyst may contain one or more base metals, which may include copper (often used for reforming methanol) and nickel (used for reforming natural gas and higher hydrocarbons). Alternatively, the catalyst may contain one or more precious metals, which may include gold, platinum, palladium, iridium, silver, rhodium and ruthenium. Furthermore, it may contain both base metal(s) and precious metal(s). The catalyst may also contain refractory materials, such as ceramics, metal oxides, perovskites, metal carbides and metal sulphides.

Additives may be added to the feed for various purposes, including acceleration of start-up of a fuel-processor, and the prevention or inhibition of its deactivation. Alternatively, a fuel to which additives have been added during manufacture can be used. In a preferred embodiment of the invention, the additive is an oxygenate, and in an especially preferred embodiment the oxygenate is MTBE (methyl-tert-butylether).

In order to facilitate the regeneration procedure, the temperature of the catalyst bed may be raised temporarily by an external energy source. Within a fuel cell system, the external energy source may be an electrical heater, or a burner (which combusts either some of the fuel or some of the hydrogen produced). In addition, or alternatively, the temperature of one or more of the feed components may be raised temporarily, again by an external heat source.

Among the most common causes of deactivation of a fuel-processor is the retention of carbon or sulphur species by the catalyst. Therefore, in a further embodiment of the invention, catalyst regeneration may occur by removal of the carbon or sulphur species. The carbon species originate from the fuel molecules, and indicate the occurrence of undesired side reactions. The sulphur species originate either from indigenous contaminants in the fuel or from compounds deliberately added to the fuel (such as the odourants used to give natural gas its recognisable smell).

The present invention will now be described by way of the following examples in which:

FIG. 1a: shows the composition of dry reformate as a function of time during reforming of dodecane (under conditions described in Example 1).

FIG. 1b shows the effect of air pulses on the composition of dry reformate during reforming of dodecane (as described in Example 2).

In both cases % in reformate is on the vertical axis and time/hours is on the horizontal axis. ♦ represents Hydrogen, ■ represents carbon dioxide, and ▲ represents carbon monoxide.

In both cases the left hand side of the vertical axis represents % in reformate and the right hand side of the vertical axis represents temperature in ° C. The horizontal axis represents time/hours; ♦ represents hydrogen, ■ represents carbon dioxide, ▲ represents carbon monoxide and x represents temperature.

It will be appreciated that many variations can be made to the invention herein described without departing from the present inventive concept.

EXAMPLE 1

Aliphatic Fuel; No Regeneration

Figure 1A:
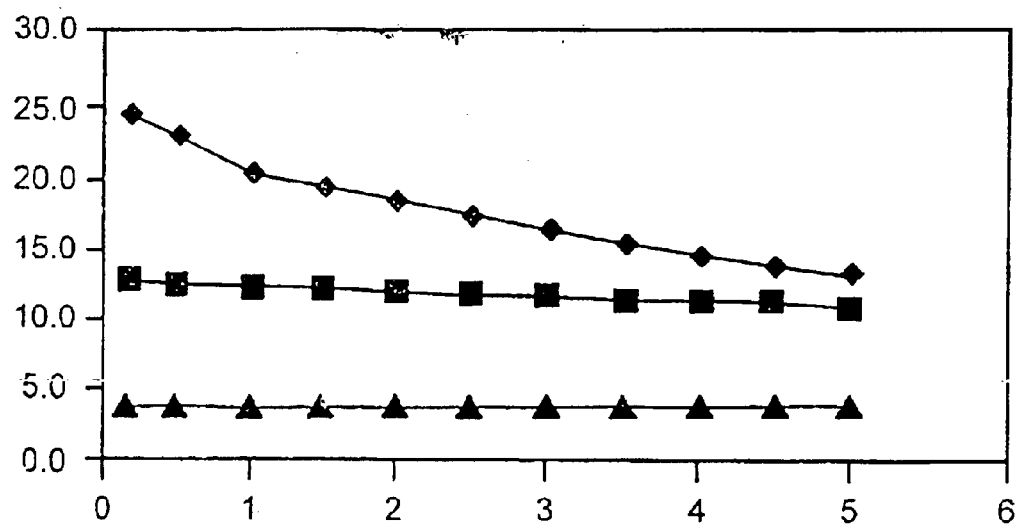

A bed (0.2 g) of reforming catalyst was packed into a tubular quartz reactor, which was positioned at the centre of a furnace. A mixture of dodecane vapour (produced by vaporising the liquid at a rate of 4 cm$^3$ hour$^{-1}$), air (200 cm$^3$ min$^{-1}$) and steam (produced by vaporising water at a rate of 4 cm$^3$ hour$^{-1}$) was passed through the catalyst bed, which was heated by the furnace. The furnace temperature was maintained at 500° C. The product stream (i.e. the reformate) passed through a drier before entering a gas chromotagraph, which was used to analyse for hydrogen. The initial concentration of hydrogen in the dry reformate was just above 25%, but declined to 20% within an hour, and to 15% within 4 hours. See FIG. 1a for results.

EXAMPLE 2

Regeneration by Air Pulses

Figure 1B:
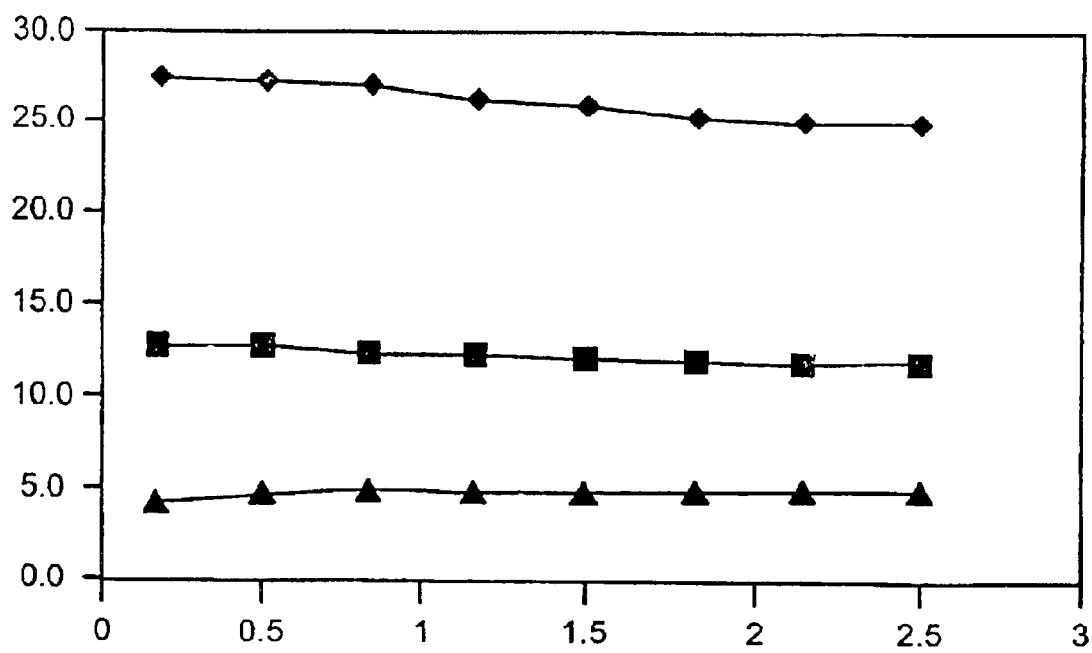

The test procedure described in Example 1 was repeated with a fresh charge of catalyst, except that every 10 minutes the air feed-rate was increased to 350 cm$^3$ min$^{-1}$ for 30 seconds. Apart from the duration of the extra air pulses, the concentration of hydrogen in the dry reformate remained above 25% during 3 hours of testing. See FIG. 1b for results.

EXAMPLE 3

Regeneration by Temperature Excursions

The test procedure described in Example 1 was repeated with a fresh charge of catalyst. Whenever the hydrogen concentration in the dry reformate dropped below 25%, it could be restored by raising the furnace temperature to 600° C. for 1 minute.

EXAMPLE 4

Inhibition of De-activation by MTBE Addition

The test procedure described In Example 1 was repeated with a fresh charge of catalyst, except that 10% (by volume) methyl-tert-butylether was added to the dodecane. The hydrogen concentration in the dry reformate remained above 25% throughout 5 hours of testing.

EXAMPLE 5

Aromatic Fuel; no Regeneration

Figure 2A:
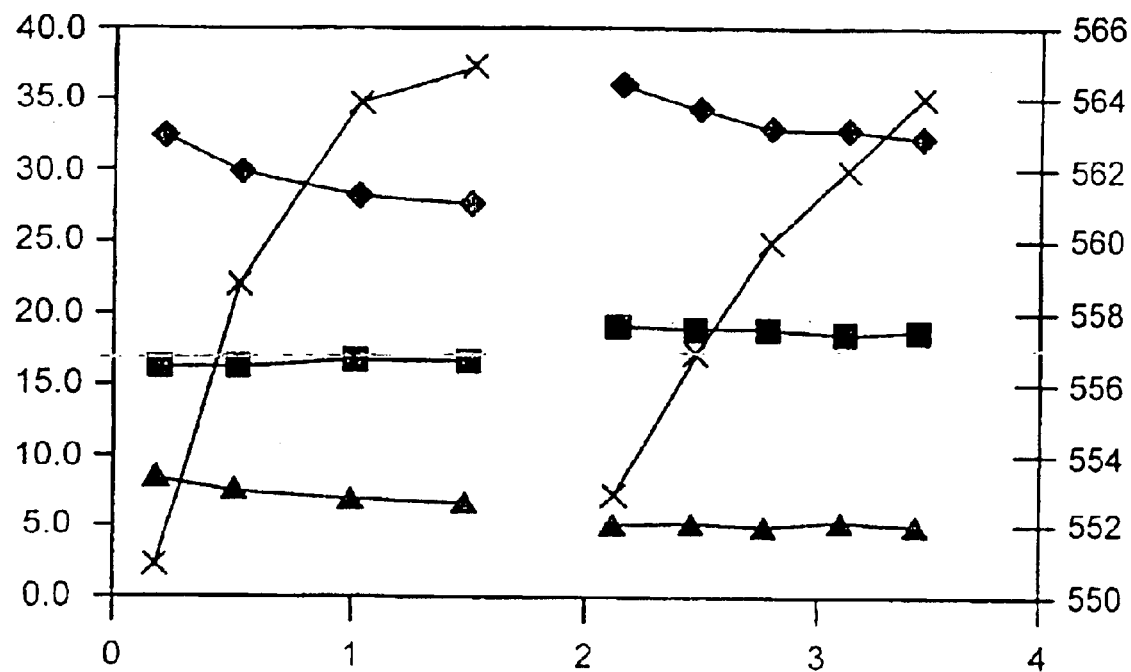
FIG. 2a shows the composition of dry reformate as a function of time during the reforming of toluene under the two conditions described in example 5.

A bed (0.2 g) of reforming catalyst was packed into a tubular quartz reactor, which was positioned at the centre of a furnace. A mixture of toluene vapour (produced by vaporising the liquid at a rate of 4 cm$^3$ hour$^{-1}$), air (175 cm$^3$ min$^{-1}$) and steam (produced by vaporising water at a rate of 4 cm$^3$ hour$^{-1}$) was passed through the catalyst bed, which was heated by the furnace. The furnace temperature was maintained at 500° C. The initial concentration of hydrogen in the dry reformate was 33%, but declined to 25% within 3 hours. When the catalyst was replaced by a fresh charge and the feed-rate of steam was doubled (by increasing the rate of vaporising water to 8 cm$^3$ hour$^{-1}$), the initial concentration of hydrogen in the dry reformate was 37%. Within 3 hours, the hydrogen concentration had declined to 30%. See FIG. 2a for results.

EXAMPLE 6

Prevention of De-activation by Extra Air

Figure 2B:
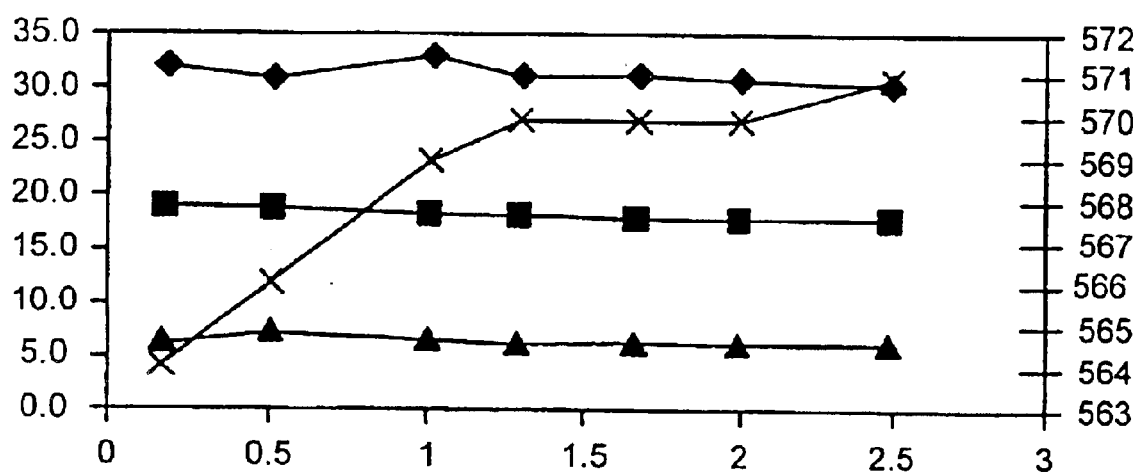
FIG. 2b shows the effect of increasing the air feed-rate on the composition of dry reformate, during reforming of toluene (as described in example 6).

The test procedure described in Example 5 was repeated with a fresh charge of catalyst, except that the air feed-rate was increased to 200 cm$^3$ min$^{-1}$. The initial concentration of hydrogen in the dry reformate was 32%. The concentration remained unchanged during 3 hours of testing. See FIG. 2b for results.

What is claimed:

1. A method for regenerating a catalytic fuel processor, wherein one component of the processor is a bed of reforming catalyst that reforms fuel thereby producing reformate having a concentration of hydrogen, while the processor is being used to supply hydrogen to a fuel cell, comprising any one or more of the steps of:

continuing to pass fuel, air and steam through the bed of reforming catalyst to produce reformate and heating the bed of reforming catalyst by an external heat source such that the temperature of the catalyst may be adjusted to regenerate the bed of reforming catalyst, continuing to pass fuel, air and steam through the bed of reforming catalyst to produce reformate and modulating the air and/or steam feed rate supplied to the bed of reforming catalyst to regenerate the bed of reforming catalyst, continuing to pass air, fuel and steam through the bed of reforming catalyst to produce reformate and modulating the feed-rate of the fuel supplied to the bed of reforming catalyst to regenerate the bed of reforming catalyst, continuing to pass fuel, air and steam through the bed of reforming catalyst to produce reformate and adding an oxygenate to the feed supplied to the bed of reforming catalyst to regenerate the bed of reforming catalyst, and maintaining the hydrogen concentration (as measured in dry reformate) above 25% throughout the operation of the processor, wherein the hydrogen concentration is measured by gas chromatography after the reformate is passed through a drier.

2. A method for preventing or retarding the de-activation of a catalytic fuel processor wherein one component of the processor is a bed of reforming catalyst that reforms fuel thereby producing reformate having a concentration of hydrogen, while the processor is being used to supply hydrogen to a fuel cell comprising any one or more of the steps of:

continuing to pass fuel, air and steam through the bed of reforming catalyst to produce reformate and heating the bed of reforming catalyst by an external heat source such that the temperature of the catalyst may be adjusted to regenerate the bed of reforming catalyst, continuing to pass fuel, air and steam through the bed of reforming catalyst to produce reformate and modulating the air and/or steam feed rate supplied to the bed of reforming catalyst to regenerate the bed of reforming catalyst, continuing to pass air, fuel and steam through the bed of reforming catalyst to produce reformate and modulating the feed-rate of the fuel supplied to the bed of reforming catalyst to regenerate the bed of reforming catalyst, continuing to pass fuel, air and steam through the bed of reforming catalyst to produce reformate and adding an oxygenate to the feed supplied to the bed of reforming catalyst to regenerate the bed of reforming catalyst, and maintaining the hydrogen concentration (as measured in dry reformate) above 25% throughout the operation of the processor, wherein the hydrogen concentration is measured by gas chromatography after the reformate is passed through a drier.

3. A method according to either claim 1 or claim 2, whereby water is temporarily added to the fuel.

4. A method according to claim 1 or 2 in which air is temporarily added to the feed.

5. A method according to claim 1 or 2 in which the oxygenate is added to the feed.

6. A method according to claim 5 in which the oxygenate is MTBE (methyl-tert-butylether).

7. A method according to claim 1 or 2 in which the temperature of the bed of reforming catalyst is raised temporarily by an external heat source.

8. A method according to claim 1 or 2 in which the temperature of the fuel, air or steam is raised temporarily.

* * * * *